Patented Sept. 30, 1952

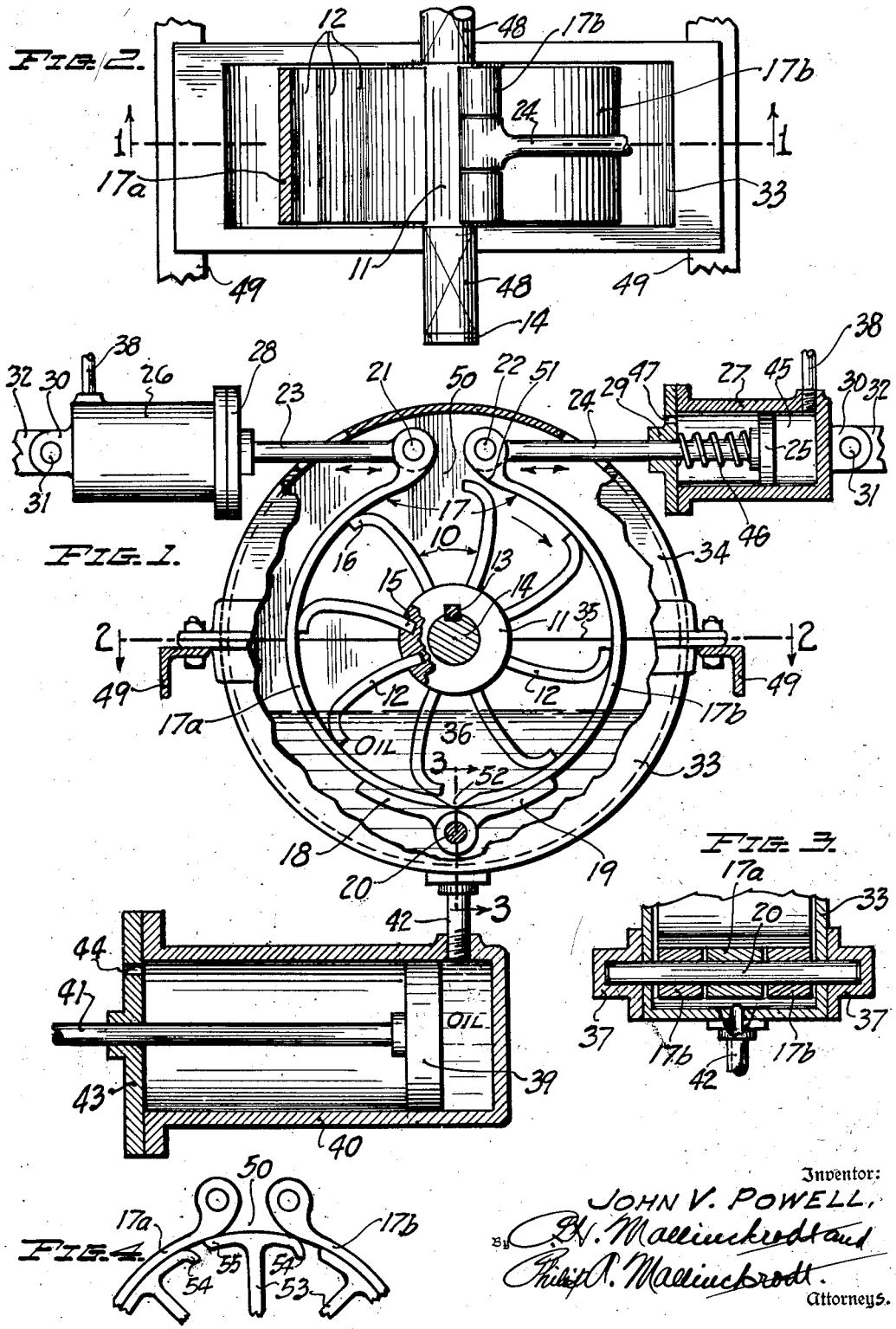

2,612,241

UNITED STATES PATENT OFFICE 2,612,241

TRUCK AUXILIARY BRAKE

John V. Powell, Price, Utah

Application May 15, 1947, Serial No. 748,194

16 Claims. (Cl. 188—75)

This invention relates to an auxiliary brake for a truck that is brought into operation at times when the regular truck brakes are inadequate to supply the requisite braking power.

In the heavy hauling industry where large loads and steep grades are not uncommon, it frequently happens that the regular brakes are not capable of providing sufficient braking power to properly control the truck.

Regular truck brakes are lined with material that is perfectly satisfactory on roads where running conditions are favorable, but are subject to being burnt out on the heavier grades.

The prime object of the invention is to provide a simple, powerful auxiliary braking mechanism that can be brought into operation to meet conditions that might prove ruinous to regular brakes.

It is also an important object to prevent undue stresses on truck motors where these are used under compression, as is common practice, to supply a part of the braking action.

During the course of the detailed description that appears hereinafter, other objects of the invention will become self-evident.

In the accompanying drawing, which illustrates one embodiment of the invention,

Fig. 1 represents a side elevation largely in vertical section taken on the line 1—1 in Fig. 2;

Fig. 2, a plan partially in horizontal section, taken on the line 2—2 in Fig. 1, parts in the foreground and parts in the background being omitted;

Fig. 3, a fragmentary vertical section taken on the line 3—3 in Fig. 1; and,

Fig. 4, a fragmentary detail showing a modification.

Referring to the drawing, the numeral 10 denotes a spider-like rotor comprising a hub 11 from which radiate arms or blades 12. The hub 11 is rigidly secured, for example by means of a key 13, on the usual drive shaft 14 of a truck motor (not shown).

The arms 12 are rigidly secured in the hub 11 either by being cast therein or welded in place, as indicated at 15. Considering that the rotation of the usual crankshaft is clockwise, as indicated by the arrow in Fig. 1, the tip of each of the arms is preferably curved slightly away from the direction of rotation, as indicated at 16.

Encircling the spider 10 at the periphery thereof is a brake shoe means or brake band 17 that is preferably made substantially in halves 17a and 17b. The half 17a is welded or otherwise secured in a lug 18, while the half 17b is similarly secured to a lug 19. The lugs 18 and 19 are hinged on a pin 20 so that the two halves 17a and 17b, relative to the spider 10, have limited opening and closing motions. In order to effect the opening and closing motions of the shoes 17a and 17b, these are pivotally connected at 21 and 22 to the respective rods 23 and 24. The rods 23 and 24 are disposed for back and forth movement, in this instance by means of pistons, one of which is shown at 25, Fig. 1. The pistons are reciprocatively mounted in the respective cylinders 26 and 27, the cylinders having the respective heads 28 and 29 that serve as guide for the respective rods. The cylinders 26 and 27 have the respective integral lugs 30 that are pivotally connected at 31 to members 32 that advantageously are fixed with respect to the truck chassis or framework (not shown).

The spider 10 together with the shoes 17a and 17b are enclosed in a casing having a liquid-tight lower portion 33 and an upper portion 34 secured together along a parting plane 35. The lower portion 33 forms a reservoir for a liquid 36 such as oil, that at least partially submerges the spider and its shoes.

In applying the brake, air under pressure is admitted to the cylinders 26 and 27 whereby the respective pistons are moved forwardly and consequently urge the respective contractile shoes 17a and 17b against the tips 16 of the blades 12. This frictionally retards the rotation of the spider 10, and consequently slows the rotation of the drive shaft 14 accordingly. In order that the braking force shall be properly applied, the pin 20 is secured against displacement by being held in bearings 37, these bearings being fixed, for example by welding, on the casing 33. At the same time, in order to divide the braking substantially equally between the shoes 17a and 17b, compressed air from a suitable source (not shown) is supplied to the two cylinders through conduits 38 that are controlled by a valve (not shown) located within easy reach of the operator of the truck.

It is to be noted that the cylinders 26 and 27, being pivotally disposed at 31, as already mentioned herein, are thus made to compensate for the slight oscillation that results when the respective piston rods 23 and 24 are reciprocated.

A feature of the invention is that the brake is disposed to run in a bath of oil, indicated for example at 36, the level of this bath being controlled by means of a piston 39 that is reciprocatively mounted in a cylinder 40, the piston being actuated by means of a rod 41. In Fig. 1 it will be noted that the piston 39 as shown, is near the end of its stroke towards the right, the oil bath 36 being approximately at its maximum depth. As dictated by the judgment of the operator, the level of the oil bath 34 may be lowered, or it may be completely evacuated from the casing 33, by moving the piston 39 towards the left. Thus, the cylinder 40 functions as a storage reservoir from which the oil may be selectively admitted to, or drained from, the casing 33. For this purpose a pipe 42 provides communication between casing 33 and cylinder 40.

The piston rod 41 is reciprocated by any suitable well known means extending to a convenient point of manipulation by the operator. Since such means in numerous different forms can be readily supplied by any skilled engineer, it is deemed not necessary to illustrate a particular mechanism in this instance.

The cylinder 40 may have a head 43 that serves as a guide for piston rod 41. A relief port is indicated at 44.

In Fig. 1, the brake shoes are shown in the applied position, that is to say, in the position occupied after compressed air has been admitted to the space 45. When the air is exhausted from this space in the respective cylinders 26 and 27, because of a manipulative act of the operator, compression springs, such as the one at 46, exert a tensioned force to retract the respective rods 23 and 24, together with their associated parts. Each of the cylinders 26 and 27 has a relief port, illustrated for example, at 47.

The shaft 14 is rotatably mounted in bearings 48 which are suitably fixed on the framework (not shown) of the truck, while the casing is fixed on members 49 that in turn are also fixed on the said framework.

In operation, the blades 12 of the rotor 10 pass through the gap 50 between the extremities of the respective brake shoes 17a and 17b, but are prevented from making undue noise by means of the curved tips 16 that slide easily over the curved portion 51 of, for example, the shoe 17b. A similar prevention of undue noise exists at the V-gap 52.

In Fig. 4 is shown a construction of the rotor arms that bridges the gaps aforesaid, thereby keeping at least a portion of each spider arm constantly in contact with a brake shoe surface. In this construction, a blade 53 has the rounded pilot projection 54 that extends in the direction of rotation, and a follower projection 55. It will be noticed that the gap 50 in Fig. 4 is completely bridged. Both the blades 12 and the blades 53 are approximately radial in the preferred disposition thereof.

During operation of the brake, the oil bath 36 serves to prevent excessive heating of the blades and the brake bands, and also serves to retard excessive speed of rotation since the blades must splash through the oil somewhat after the performance of a pump impeller. It is desirable that the casing be made oil-tight, which can be accomplished in any well known manner and need not be particularly illustrated in the present instance.

It is desirable that the blades 12 and 53 be made of material having considerable resiliency, for illustration, spring steel or heat treated steel, so as to exert a certain degree of yielding pressure against the brake shoes. The brake shoes 17a and 17b are best made of a tough steel, for illustration, what is known as "plough steel," in order to withstand severe usage.

While a specific embodiment of the invention is herein shown and described, the scope of the invention is limited only by the following claims.

What is claimed is:

1. A truck auxiliary brake, comprising a rotor having a plurality of blades extending approximately radially thereof, said blades having tips spaced apart circumferentially of the rotor so each blade with its respective tip stands free and alone to, in effect, constitute a brake drum; and contractile brake shoe means disposed to frictionally engage the tips of said blades.

2. A truck auxiliary brake according to claim 1, wherein a casing encloses the said rotor and brake shoe means, said casing being adapted to contain oil submerging at least a portion of said rotor blades and tips and brake shoe means.

3. A truck auxiliary brake, according to claim 2, wherein is included storage reservoir means into which the oil from said rotor blades and tips is intermittently drained.

4. A truck auxiliary brake according to claim 3, including means operative to selectively circulate oil between said rotor blades, said blade tips and said reservoir.

5. A truck auxiliary brake comprising a rotor having a plurality of blades extending approximately radially thereof to, in effect, constitute a brake drum, said blades being provided with friction tips spaced apart circumferentially of the rotor free and independent of one another; a two-part contractile brake shoe means disposed to engage said friction tips; and means operative to contract or to relax, as the case may be, said brake shoe means.

6. A truck auxiliary brake comprising a rotor having a plurality of independent and spaced apart circumferential braking surface means to, in effect, constitute a brake drum; contractile brake shoe means disposed to alternately engage said braking surface means and to release the same; means operative to alternately contract and expand said contractile brake shoe means; and means disposed to confine a liquid that at least partially submerges said plurality of independent and spaced apart circumferential braking surface means and said brake shoe means.

7. A truck auxiliary brake according to claim 6, including means operative to selectively withdraw the liquid from said plurality of independent circumferential braking surface means or to selectively restore the liquid thereto, as the case may be.

8. A truck auxiliary brake, comprising a rotor having a plurality of spaced apart so as to be independent of one another circumferentially disposed frictional braking surface means to, in effect, constitute a brake drum; brake shoe means operative to engage said braking surface means; and liquid submerging means operative selectively upon said frictional braking surface means and said brake shoe means.

9. A truck auxiliary brake, comprising circumferential brake shoe means having a gap in the circumferential continuity thereof; a rotor having a plurality of resilient blades extending approximately radially therefrom to, in effect, constitute a brake drum, said blades having tip portions disposed to bridge said gap; and means operative to cause said brake shoe means to engage said rotor.

10. A truck auxiliary brake according to claim 9, including means operative to selectively apply a bath of liquid to said brake shoe means and to said rotor, said means comprising a liquid-tight casing in which said brake-shoe means and said rotor are operatively disposed; a liquid storage reservoir and means operative to selectively transfer liquid from said casing to said storage reservoir, and vice versa.

11. Braking mechanism, comprising a rotor having a plurality of individually free blades extending approximately radially therefrom to, in effect, constitute a brake drum, said blades having respective arcuate friction tips spaced apart from one another and lying in the cylindrical surface of the brake drum; and contractile brake shoe means disposed to frictionally engage the said arcuate tips of said blades.

12. The combination recited in claim 11, wherein the friction tips project backwardly of the respective blades away from the direction of rotation of the rotor.

13. The combination recited in claim 11, wherein the friction tips project both forwardly and backwardly of the respective blades.

14. The combination recited in claim 11, wherein the blades are substantially elongated in planes which extend longitudinally with the rotative axis of said rotor, so that the axis of greater bending of each blade lies in the rotative plane of the rotor.

15. The combination recited in claim 11, wherein the rotor and brake shoe means are enclosed within a tight housing adapted to contain a body of lubricant in intimate association with the braking surfaces of said rotor and brake shoe means.

16. Braking mechanism, comprising brake drum means characterized by friction tips arcuately spaced apart from one another and cooperative brake shoe means disposed within a tight housing adapted to contain a body of lubricant in intimate association with the braking surfaces of said arcuately spaced friction tips and brake shoe means.

JOHN V. POWELL.

REFERENCES CITED

The following references are of record in the file of this patent:

UNITED STATES PATENTS

| Number | Name | Date |
|---|---|---|
| 606,959 | Doolittle | July 5, 1898 |
| 1,131,810 | Zoller et al. | Mar. 16, 1915 |
| 1,192,233 | Zevery | July 25, 1916 |
| 1,193,366 | Demara | Aug. 1, 1916 |
| 1,781,437 | Chisholm | Nov. 11, 1930 |
| 2,391,074 | Schnell | Dec. 18, 1945 |

FOREIGN PATENTS

| Number | Country | Date |
|---|---|---|
| 197,362 | Germany | Apr. 14, 1908 |
| 559,716 | Germany | Sept. 23, 1932 |